(12) United States Patent
Baek et al.

(10) Patent No.: US 12,523,908 B2
(45) Date of Patent: Jan. 13, 2026

(54) DISPLAY PANEL AND IMAGE DISPLAY APPARATUS INCLUDING THE SAME

(71) Applicant: LG ELECTRONICS INC., Seoul (KR)

(72) Inventors: Seungmi Baek, Seoul (KR); Gunyoung Hong, Seoul (KR); Younggil Yoo, Seoul (KR); Minsung Kim, Seoul (KR); Kyungpil Kim, Seoul (KR); Bokyung Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/687,145

(22) PCT Filed: Aug. 31, 2021

(86) PCT No.: PCT/KR2021/011687
§ 371 (c)(1),
(2) Date: Nov. 6, 2024

(87) PCT Pub. No.: WO2023/033201
PCT Pub. Date: Mar. 9, 2023

(65) Prior Publication Data
US 2025/0155749 A1    May 15, 2025

(51) Int. Cl.
*G02F 1/00*   (2006.01)
*G02F 1/1335*   (2006.01)
*G02F 1/13357*   (2006.01)

(52) U.S. Cl.
CPC .. *G02F 1/133614* (2021.01); *G02F 1/133603* (2013.01); *G02F 1/133606* (2013.01); *G02F 2202/28* (2013.01)

(58) Field of Classification Search
None
See application file for complete search history.

(56) References Cited

U.S. PATENT DOCUMENTS 7,474,366 B2 * 1/2009 Haga ................. G02F 1/133514
                                                             349/97
2015/0333102 A1 * 11/2015 Sato ................... H10H 20/8514
                                                             257/13
(Continued)

FOREIGN PATENT DOCUMENTS

KR   10-2013-0036724 A   4/2013
KR   10-2014-0147199 A   12/2014
(Continued)

*Primary Examiner* — Gerald J Sufleta, II
(74) *Attorney, Agent, or Firm* — Birch, Stewart, Kolasch & Birch, LLP

(57) ABSTRACT

A display panel and an image display apparatus including the same are disclosed. The display panel according to an embodiment of the present disclosure includes: a plurality of light sources configured to output blue light; a first color conversion layer configured to output first light based on the blue light from a first light source among the plurality of light sources; a second color conversion layer configured to output second light based on the blue light from a second light source among the plurality of light sources; a first color filter configured to output only red light in the first light from the first color conversion layer; and a second color filter configured to output only green light in the second light from the second color conversion layer. Accordingly, transmittance of output light may increase, and color gamut may be improved.

20 Claims, 21 Drawing Sheets

(56) References Cited

U.S. PATENT DOCUMENTS

2019/0221724 A1* 7/2019 Song .................. C09K 11/70
2021/0296543 A1* 9/2021 Aoyama ................ H05B 33/12

FOREIGN PATENT DOCUMENTS

| KR | 10-2019-0063620 A | 6/2019 |
| KR | 10-2019-0078906 A | 7/2019 |
| KR | 10-1969462 B1 | 8/2019 |
| KR | 10-2019-0110660 A | 10/2019 |
| KR | 10-2020-0097373 A | 8/2020 |
| WO | WO 2020/016701 A1 | 1/2020 |
| WO | WO 2021/004086 A1 | 1/2021 |

* cited by examiner

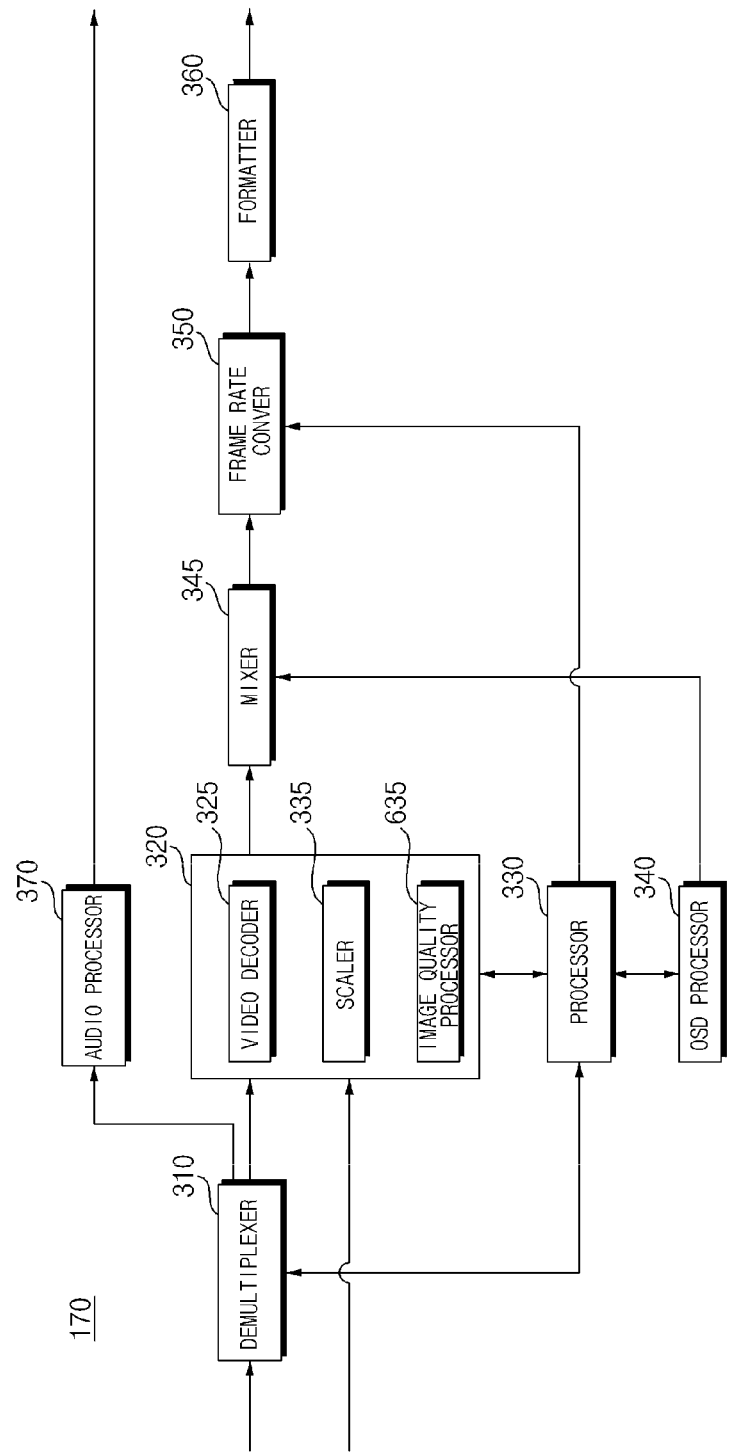

FIG. 4A
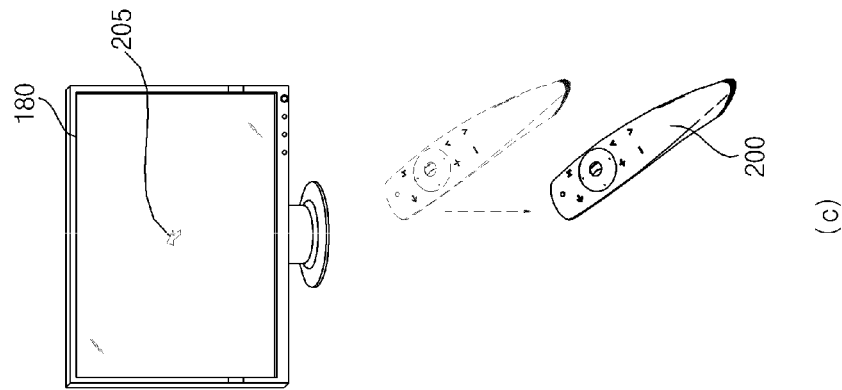
(c)
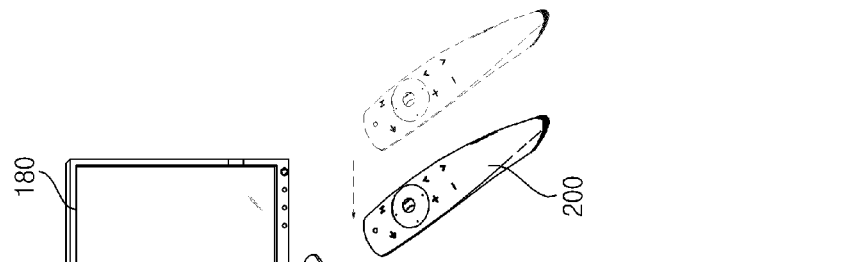
(b)
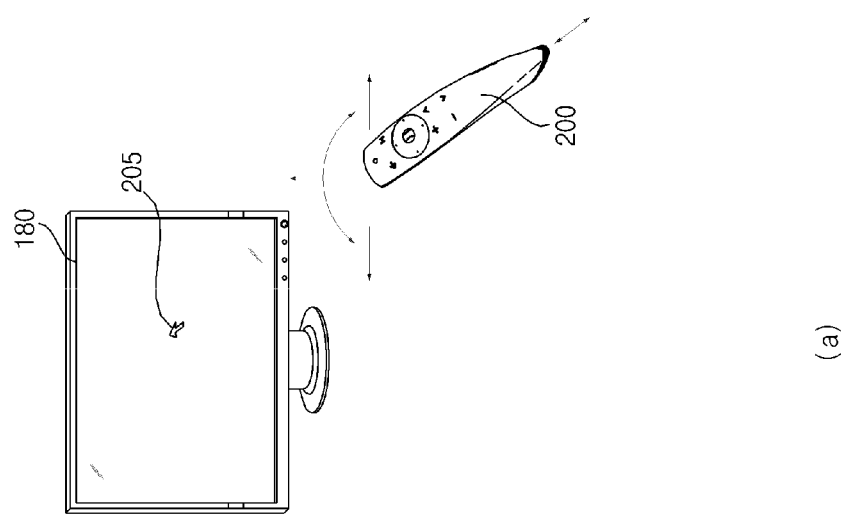
(a)

|  | NTSC COLOR GAMUT AREA RATIO | COLOR GAMUT (DCI-P3 OVERLAP RATE) | COLOR GAMUT (BT.2020 OVERLAP RATE) |
|---|---|---|---|
| GRob | 122% | 88% | 80% |
| GRoa | 121% | 98% | 80% |

| Light | TYPES OF COLOR FILTERS | CHARACTERISTICS OF LIGHT TRANSMITTED THROUGH COLOR FILTER | | | | |
|---|---|---|---|---|---|---|
| | | DOMINANT WAVELENGTH | FWHM | x | y | RELATIVE LUMINANCE |
| LB | - | 462.0 | 17.5 | 0.1497 | 0.0472 | - |
| LGB | CFbx | 533.6 | 23.4 | 0.2134 | 0.6954 | 100% |
| | CFb | 538.9 | 26.3 | 0.2275 | 0.7383 | 136% |
| LRB | CFax | 621.8 | 20.2 | 0.6888 | 0.3053 | 100% |
| | CFa | 621.0 | 20.5 | 0.6828 | 0.3073 | 111% |

| | NTSC<br>COLOR GAMUT AREA RATIO | COLOR GAMUT<br>(DCI-P3 OVERLAP RATE) | COLOR GAMUT<br>(BT.2020 OVERLAP RATE) |
|---|---|---|---|
| GRpb | 128% | 98% | 84% |
| GRpa | 127% | 99% | 84% |

DISPLAY PANEL AND IMAGE DISPLAY APPARATUS INCLUDING THE SAME

CROSS REFERENCE TO RELATED APPLICATIONS

This application is the National Phase of PCT International Application No. PCT/KR2021/011687, filed on Aug. 31, 2021, all of which are hereby expressly incorporated by reference into the present application.

BACKGROUND

1. Field

The present disclosure relates to a display panel and an image display apparatus including the same, and more particularly to a display panel capable of increasing transmittance of output light and improving color gamut, and an image display apparatus including the same.

2. Description of the Related Art

An image display apparatus is an apparatus that displays an image, and may include various types of display panels for image display.

Meanwhile, the display panel may include a color filter for outputting light in red, green, and blue (RGB) colors.

Korean Laid-open Patent Publication No. 2017-0128366 (hereinafter referred to as related art) discloses a photosensitive composition and a color converting film.

In the related art, light output by the light source passes through a color conversion layer and a color filter via a liquid crystal layer, a polarizer, and an electrode.

However, the related art has a drawback in that the light output by the light source is required to pass through the liquid crystal layer, thereby resulting in a lower light transmittance as well as a slow response speed. Further, brightness decreases, thereby reducing color gamut.

SUMMARY

It is an object of the present disclosure to provide a display panel capable of increasing transmittance of output light improving color gamut, and an image display apparatus including the display panel.

It is another object of the present disclosure to provide a display panel having a color filter capable of effectively blocking only blue light, and an image display apparatus including the display panel.

In order to achieve the above and other objectives, a display panel and an image display apparatus including the same according to an embodiment of the present disclosure include: a plurality of light sources configured to output blue light; a first color conversion layer configured to output first light based on the blue light from a first light source among the plurality of light sources; a second color conversion layer configured to output second light based on the blue light from a second light source among the plurality of light sources; a first color filter configured to output only red light in the first light from the first color conversion layer; and a second color filter configured to output only green light in the second light from the second color conversion layer.

Meanwhile, a third light source among the plurality of light sources may be configured to output the blue light to an outside without passing through the first color conversion layer, the second color conversion layer, the first color filter, and the second color filter.

Meanwhile, the first light may include the blue light and the red light, and the second light may include the blue light and the green light.

Meanwhile, the display panel may further include: a multi coating layer disposed over the plurality of light sources; an optical adhesive layer (OCA) disposed over the multi coating layer; and a short wavelength transmitting coating layer disposed over the optical adhesive layer.

Meanwhile, the display panel may further include a black matrix disposed between the first color filter and the second color filter.

Meanwhile, the first color filter may be disposed over the first color conversion layer, and the second color filter may be disposed over the second color conversion layer, wherein a sum of a height of the first color conversion layer and a height of the first color filter may be equal to a height of the black matrix.

Meanwhile, the display panel may further include glass disposed over the first color filter and the second color filter.

Meanwhile, in response to a brightness of the first light being different from a brightness of the second light, a thickness of the second color filter may be different from a thickness of the first color filter.

Meanwhile, in response to a brightness of the blue light in the first light output from the first color conversion layer being greater than a brightness of the blue light in the second light output from the second color conversion layer, a thickness of the first color filter may be greater than a thickness of the second color filter.

Meanwhile, in response to a brightness of the blue light in the second light output from the second color conversion layer being greater than a brightness of the blue light in the first light output from the first color conversion layer, a thickness of the second color filter may be greater than a thickness of the first color filter.

Meanwhile, in response to a brightness of the blue light in the second light output from the second color conversion layer being equal to a brightness of the blue light in the first light output from the first color conversion layer, a thickness of the second color filter may be equal to a thickness of the first color filter.

Meanwhile, the display panel may further include a blue light cut filter disposed over the third light source among the plurality of light sources.

Meanwhile, the first color filter and the second color filter may include a yellow-based pigment.

Meanwhile, the first color filter and the second color filter may contain at least one of a Monoazo-based pigment, a Pyrazolone azo-based pigment, a Disazo-based pigment, an Azomethine-based pigment, an Anthraquinone-based pigment, an Isoindolinone-based pigment, a quinoline-based pigment, a Quinophthalone-based pigment, a Polycyclic-based pigment, a Dioxime-based pigment, a Benzimidazolone-based pigment, a Heterocyclic-based pigment, a Perinone-based pigment, an Inorganic pigment, and a Cyanine-based pigment.

Meanwhile, the plurality of light sources may include micro light emitting diodes.

Effects of the Disclosure

A display panel and an image display apparatus including the same according to an embodiment of the present disclosure include: a plurality of light sources configured to output blue light; a first color conversion layer configured to output first light based on the blue light from a first light source among the plurality of light sources; a second color conversion layer configured to output second light based on the blue light from a second light source among the plurality of light sources; a first color filter configured to output only red light in the first light from the first color conversion layer; and a second color filter configured to output only green light in the second light from the second color conversion layer. Accordingly, transmittance of output light may increase, and color gamut may be improved.

Meanwhile, a third light source among the plurality of light sources may be configured to output the blue light to an outside without passing through the first color conversion layer, the second color conversion layer, the first color filter, and the second color filter. Accordingly, transmittance of output light may increase, and color gamut may be improved.

Meanwhile, the first light may include the blue light and the red light, and the second light may include the blue light and the green light. Accordingly, transmittance of output light may increase, and color gamut may be improved.

Meanwhile, the display panel may further include: a multi coating layer disposed over the plurality of light sources; an optical adhesive layer (OCA) disposed over the multi coating layer; and a short wavelength transmitting coating layer disposed over the optical adhesive layer. Accordingly, transmittance of output light may increase, and color gamut may be improved.

Meanwhile, the display panel may further include a black matrix disposed between the first color filter and the second color filter. Accordingly, transmittance of output light may increase, and color gamut may be improved.

Meanwhile, the first color filter may be disposed over the first color conversion layer, and the second color filter may be disposed over the second color conversion layer, wherein a sum of a height of the first color conversion layer and a height of the first color filter may be equal to a height of the black matrix. Accordingly, ambient light may be blocked by the black matrix.

Meanwhile, the display panel may further include glass disposed over the first color filter and the second color filter. Accordingly, internal elements may be protected.

Meanwhile, in response to a brightness of the first light being different from a brightness of the second light, a thickness of the second color filter may be different from a thickness of the first color filter. Accordingly, the color gamut of the output red light and green light may be improved.

Meanwhile, in response to a brightness of the blue light in the first light output from the first color conversion layer being greater than a brightness of the blue light in the second light output from the second color conversion layer, a thickness of the first color filter may be greater than a thickness of the second color filter. Accordingly, the color gamut of the output red light and green light may be improved.

Meanwhile, in response to a brightness of the blue light in the second light output from the second color conversion layer being greater than a brightness of the blue light in the first light output from the first color conversion layer, a thickness of the second color filter may be greater than a thickness of the first color filter. Accordingly, the color gamut of the output red light and green light may be improved.

Meanwhile, in response to a brightness of the blue light in the second light output from the second color conversion layer being equal to a brightness of the blue light in the first light output from the first color conversion layer, a thickness of the second color filter may be equal to a thickness of the first color filter. Accordingly, the color gamut of the output red light and green light may be improved.

Meanwhile, the display panel may further include a blue light cut filter disposed over the third light source among the plurality of light sources. Accordingly, the color gamut of the output red light, green light, and blue light may be improved.

Meanwhile, the first color filter and the second color filter may include a yellow-based pigment. Accordingly, the first color filter and the second color filter may effectively block only the blue light.

Meanwhile, the first color filter and the second color filter may contain at least one of a Monoazo-based pigment, a Pyrazolone azo-based pigment, a Disazo-based pigment, an Azomethine-based pigment, an Anthraquinone-based pigment, an Isoindolinone-based pigment, a quinoline-based pigment, a Quinophthalone-based pigment, a Polycyclic-based pigment, a Dioxime-based pigment, a Benzimidazolone-based pigment, a Heterocyclic-based pigment, a Perinone-based pigment, an Inorganic pigment, and a Cyanine-based pigment. Accordingly, the first color filter and the second color filter may effectively block only the blue light.

Meanwhile, the plurality of light sources may include micro light emitting diodes. Accordingly, transmittance of output light may increase, and color gamut may be improved.

BRIEF DESCRIPTION OF THE DRAWINGS

FIG. 3 is an exemplary internal block diagram of the signal processing device in FIG. 2;

FIG. 4A is a diagram showing a method of controlling a remote controller of FIG. 2;

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
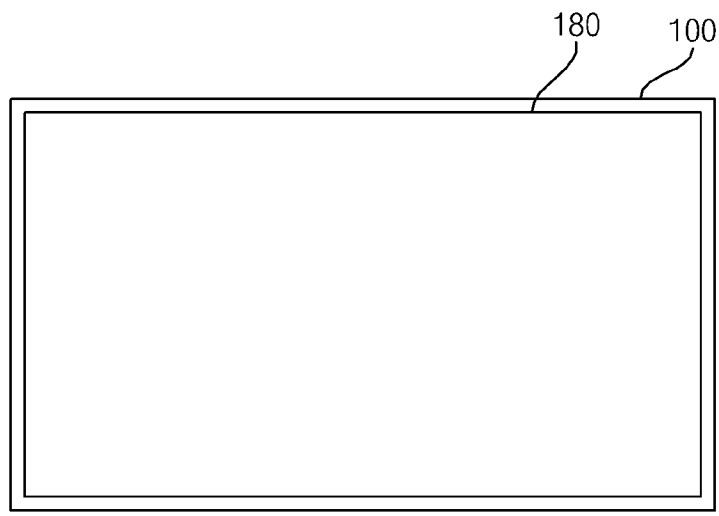
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The image display apparatus 100 may receive image signals from various external devices and the like, and may perform signal processing on the signals to display an image on the display 180.

Various external devices may be, for example, a computer (PC), a mobile terminal 600 such as a smartphone, a set-top box (STB), a game console (GSB), a server (SVR), and the like.

Meanwhile, the display 180 may be implemented as any one of various panels. For example, the display 180 may be one of self-emitting display panels, such as an organic display panel (organic light-emitting diode (OLED) panel), inorganic display panel (Light Emitting Diode (LED) panel), a micro-LED panel, and the like.

The following description will be made of the display 180 having an LED panel.

Meanwhile, a display panel 210 (see FIG. 7) in the display 180 includes a color filter for outputting light of red, green, and blue colors.

The embodiments of the present disclosure propose a display panel 210 capable of increasing transmittance of output light and improving color gamut, which will be described later with reference to FIG. 7 and subsequent figures.

Meanwhile, the image display apparatus 100 according to an embodiment of the present disclosure includes a signal processing device 170 (see FIG. 2) configured to output a processed image signal, and a display 180 configured to display an image based on the image signal, wherein the display 180 includes a display panel 210 capable of increasing transmittance of output light and improving color gamut.

Meanwhile, the image display apparatus 100 of FIG. 1 may be a TV, a monitor, a tablet PC, a mobile terminal, a vehicle display device, and the like.

Figure 2:
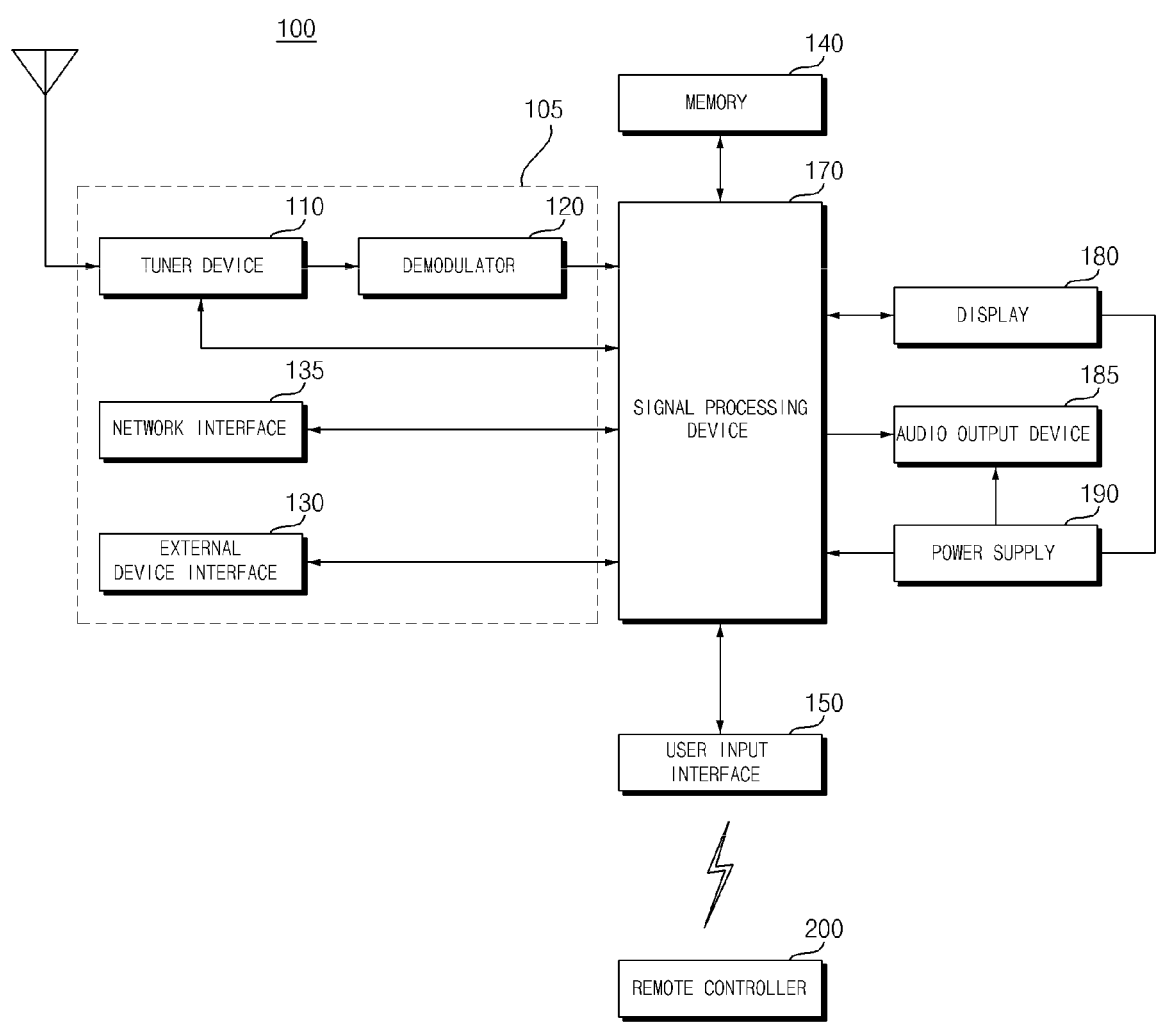
FIG. 2 is an exemplary internal block diagram of the image display apparatus of FIG. 1.

FIG. 2 is an exemplary internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

The tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box STB. To this end, the external apparatus interface 130 may include an A/V input and output device (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter to convert an AC power into a DC voltage, and a DC/DC converter to convert the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

FIG. 3 is an exemplary internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially a display panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
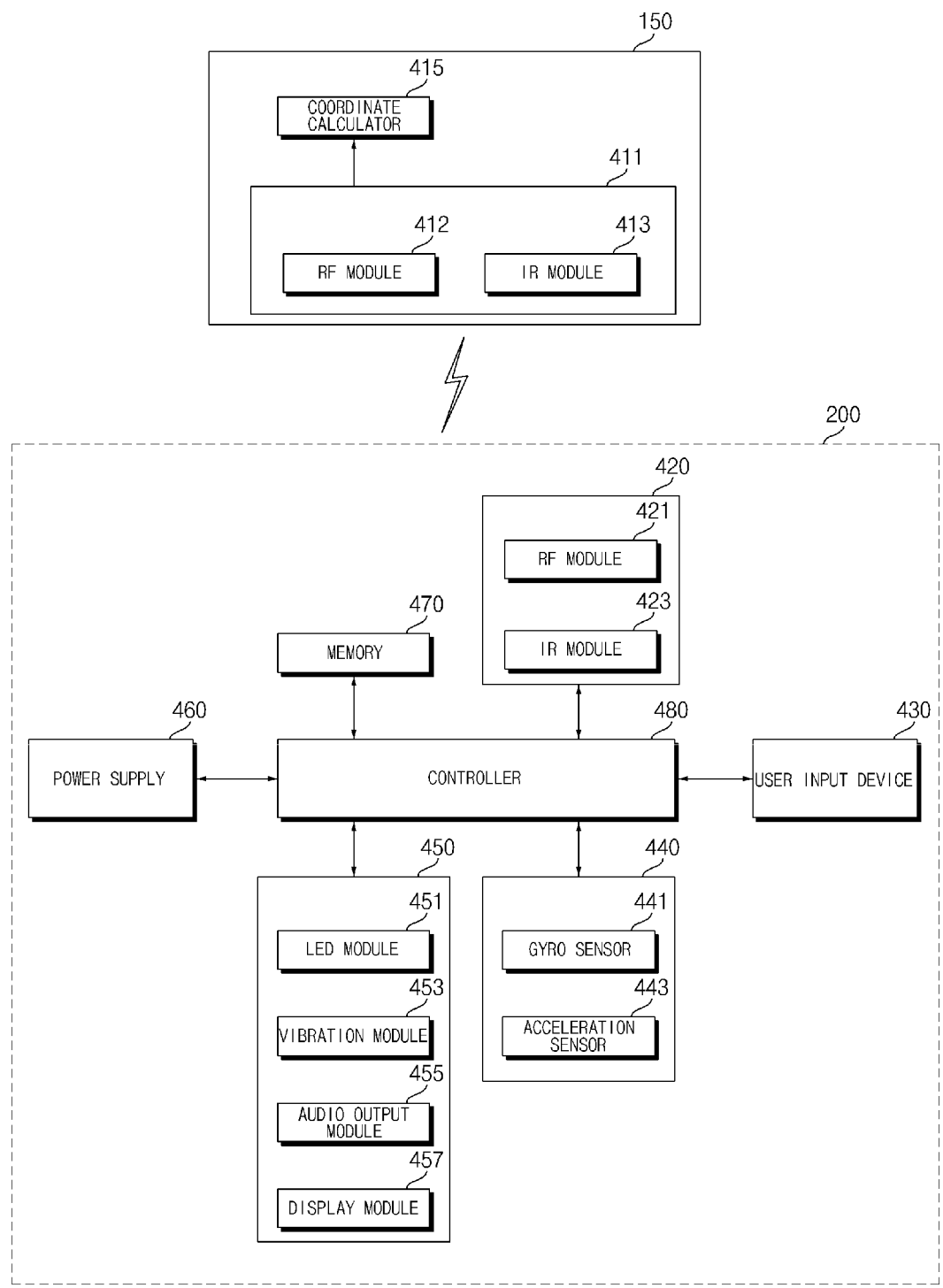
FIG. 4B is an internal block diagram of the remote controller of FIG. 2.

FIG. 4B is an internal block diagram 41 remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error For another example, unlike the figure, the coordinate value calculator 415 may be provided in the signal processing device 170, not in the user input interface 150.

Figure 5:
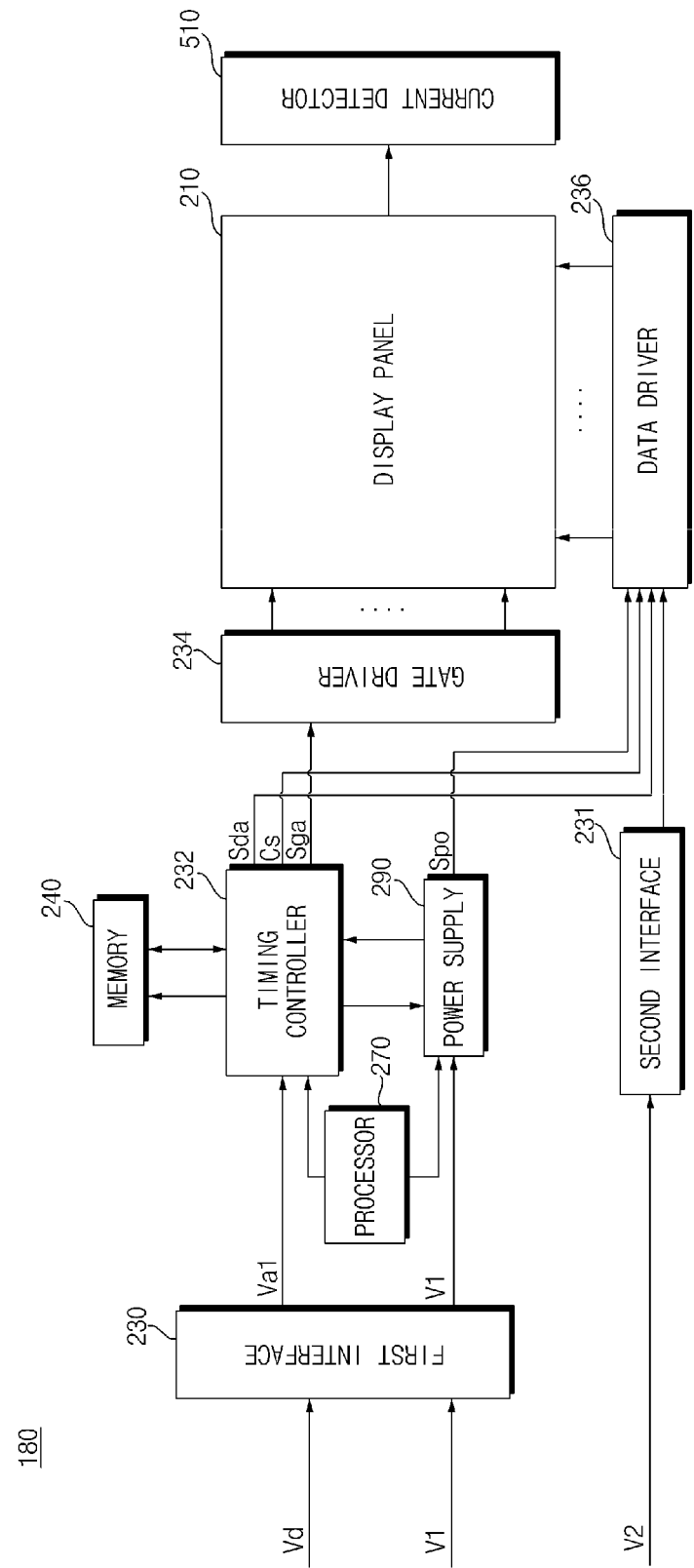
FIG. 5 is an exemplary internal block diagram of a display of FIG. 2.

FIG. 5 is an exemplary internal block diagram of the display of FIG. 2.

Referring to FIG. 5, a display panel-based display 180 may include a display panel 210, a first interface 230, a second interface 231, a timing controller 232, a gate driver 234, a data driver 236, a memory 240, a processor 270, a power supply 290, a current detector 510, and the like.

The display 180 receives a video signal Vd, first DC power V1, and second DC power V2, and may display a predetermined image based on the video signal Vd.

Meanwhile, the interface 230 in the display 180 may receive the video signal Vd and the first DC power V1 from the signal processing device 170.

Here, the first DC power V1 may be used for the operation of the power supply 290 and the timing controller 232 in the display 180.

Next, the second interface 231 may receive the second DC power V2 from an external power supply 190. Meanwhile, the second DC power V2 may be input to the data driver 236 in the display 180.

The timing controller 232 may output a data driving signal Sda and a gate driving signal Sga based on the video signal Vd.

For example, when the first interface 230 converts the input video signal Vd and outputs the converted video signal va1, the timing controller 232 may output the data driving signal Sda and the gate driving signal Sga based on the converted video signal va1.

The timing controller 232 may further receive a control signal, a vertical synchronization signal Vsync, etc., in addition to the video signal Vd from the signal processing device 170.

In addition, the timing controller 232 may output the gate driving signal Sga for the operation of the gate driver 234 and the data driving signal Sda for the operation of the data driver 236 based on a control signal, the vertical synchronization signal Vsync, etc., in addition to the video signal Vd.

In this case, the data driving signal Sda may be a data driving signal for driving of RGB subpixels when the panel 210 includes RGB subpixels.

Meanwhile, the timing controller 232 may further output a control signal Cs to the gate driver 234.

The gate driver 234 and the data driver 236 may supply a scan signal and the video signal to the display panel 210 through a gate line GL and a data line DL, respectively, according to the gate driving signal Sga and the data driving signal Sda from the timing controller 232. Accordingly, the display panel 210 displays a predetermined video.

Meanwhile, the display panel 210 may include a plurality of light sources, and may be arranged so that a plurality of gate lines GL intersect a plurality of data lines DL in a matrix form in each pixel corresponding to the plurality of light sources.

Meanwhile, the data driver 236 may output a data signal to the display panel 210 based on the second DC power V2 from the second interface 231.

The power supply 290 may supply various levels of power to the gate driver 234, the data driver 236, the timing controller 232, and the like.

The current detector 510 may detect a current flowing in sub-pixels of the display panel 210. The detected current may be input to the processor 270b or the like, for a calculating an accumulated current amount.

The processor 270 may perform various control operations in the display 180. For example, the processor 270 may control the gate driver 234, the data driver 236, the timing controller 232, and the like.

Meanwhile, the processor 270 may receive information on the current flowing to the sub-pixels of the display panel 210 from the current detector 510.

Further, the processor 270 may calculate an accumulated current amount of each subpixel of the display panel 210 based on the information about the current flowing in the sub-pixels of the display panel 120. The calculated accumulated current amount may be stored in the memory 240.

Figure 6A:
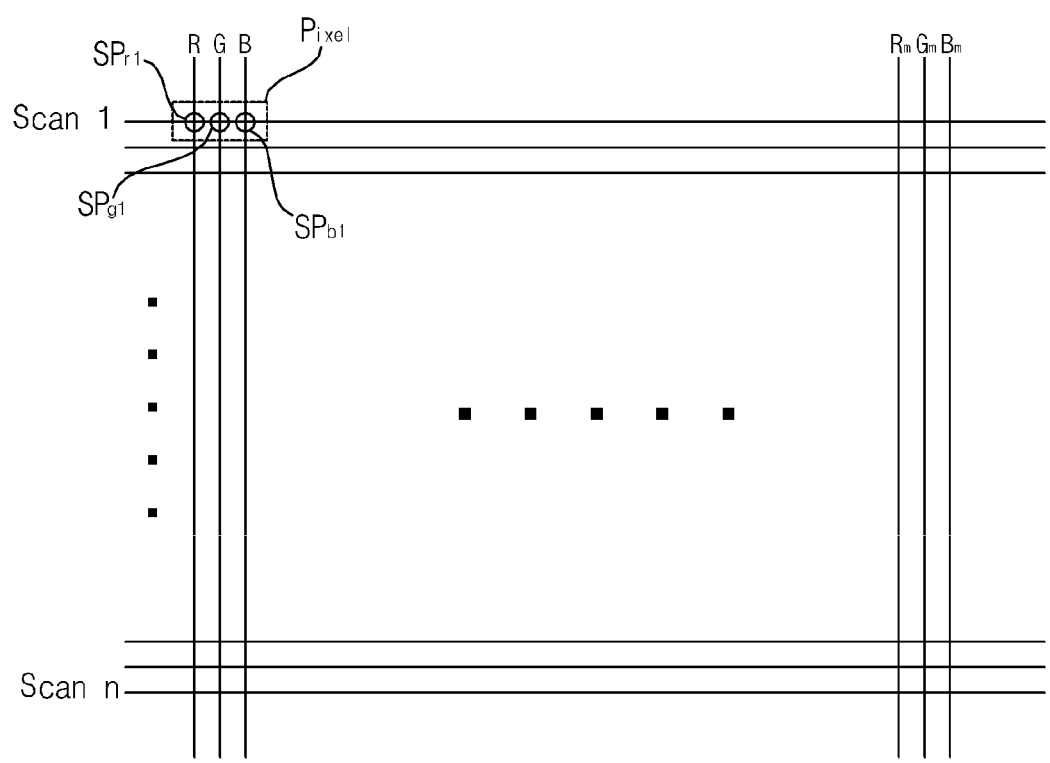
FIGS. 6A and 6B are diagrams referred to in the description of a display panel of FIG. 5.
Figure 6B:
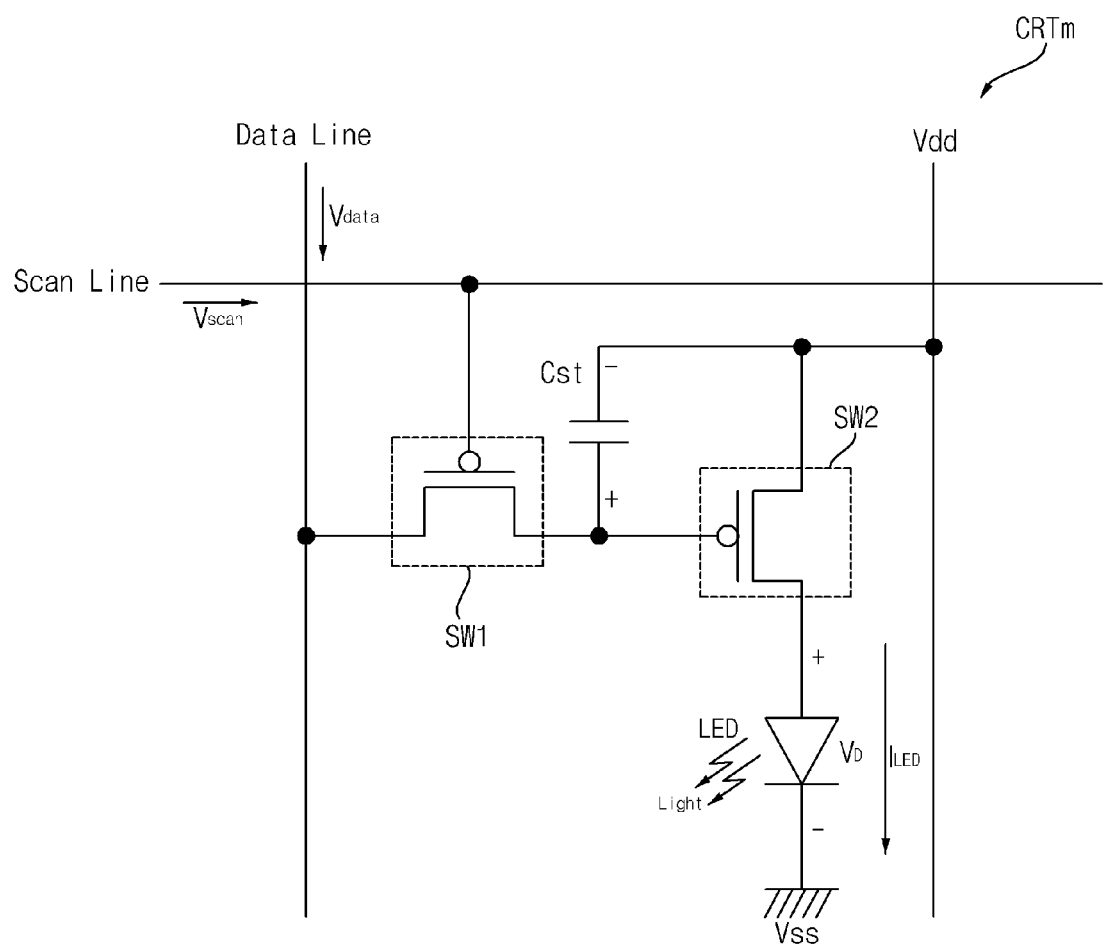

FIGS. 6A and 6B are diagrams referred to in the description of the display panel of FIG. 5.

First, FIG. 6A is a diagram illustrating a pixel in the display panel 210.

Referring to FIG. 6A, the display panel 210 may include a plurality of scan lines Scan 1 to Scan n and a plurality of data lines R1, G1, B1, to Rm, Gm, and Bm intersecting the scan lines.

Meanwhile, a pixel (subpixel) is defined in an intersecting area of the scan lines and the data lines in the display panel 210. In the drawing, a pixel having sub-pixels SR1, SG1, and SB1 of RGB is shown.

FIG. 6B illustrates a circuit of any one sub-pixel in the pixel of the display panel of FIG. 6A.

Referring to FIG. 6B, a sub pixel circuit CRTm may include, as an active type, a scan switching element SW1, a storage capacitor Cst, a drive switching element SW2, and a light emitting diode (LED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

In another example, if the data signal has a different length according to a pulse width modulation (PWM) method, a power level stored in the storage capacitor Cst varies according to a length difference of the data signal Vdata.

The drive switching element SW2 is turned on according to the power level stored in the storage capacitor Cst. When the drive switching element SW2 is turned on, the driving current (ILED), which is proportional to the stored power level, flows in the light emitting diode (LED). Accordingly, the light emitting diode LED performs a light emitting operation.

The light emitting diode LED may output blue light.

Meanwhile, the subpixels may output green light, red light, and blue light based on the blue light output by the light emitting diode LED.

That is, a green sub-pixel outputs green light, a red sub-pixel outputs red light, and a blue sub-pixel emits blue light.

Meanwhile, a separate color filter is provided for the green and red sub-pixels in order to realize colors. However, the blue sub-pixel which emits blue light does not require a separate color filter.

Meanwhile, in the drawing, it is illustrated that a p-type MOSFET is used for the scan switching element SW1 and the drive switching element SW2, but an n-type MOSFET or other switching element, such as a JFET, IGBT, SIC, or the like are also available.

Figure 7:
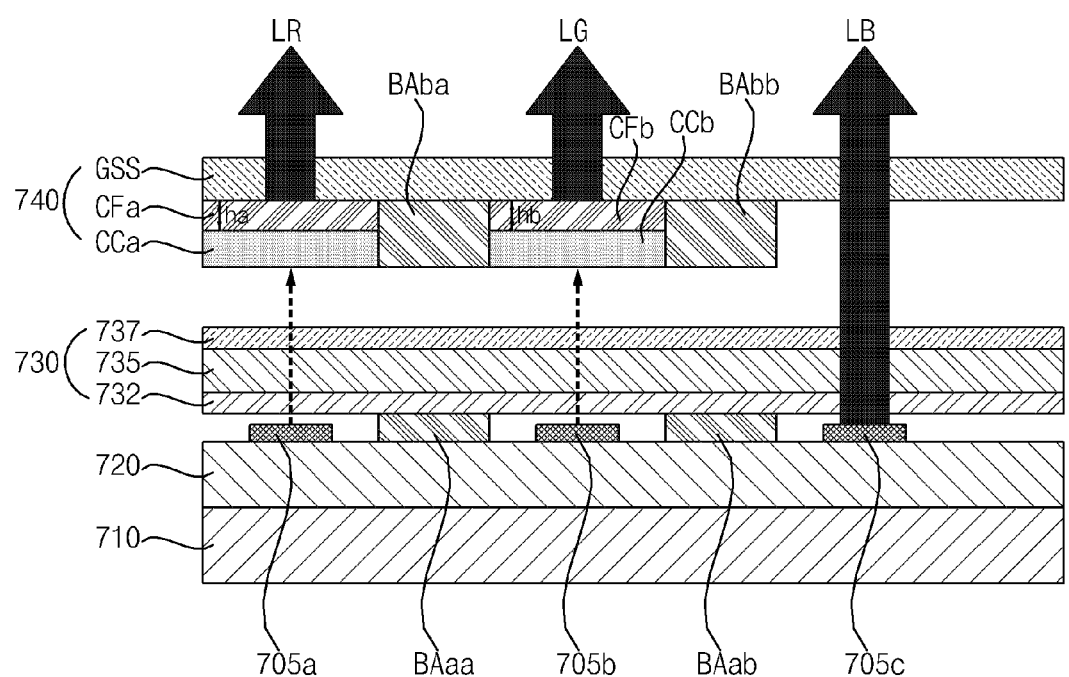
FIG. 7 is an exemplary cross-sectional view of a display panel according to an embodiment of the present disclosure.

FIG. 7 is an exemplary cross-sectional view of the display panel 210 according to an embodiment of the present disclosure.

Referring to FIG. 7, the display panel 210 according to an embodiment of the present disclosure includes: a plurality of light sources 705a to 705c configured to output blue light LB; a first color conversion layer CCa configured to output first light LRB based on the blue light LB from a first light source 705a among the plurality of light sources 705a to 705c; a second color conversion layer CCb configured to output second light LGB based on the blue light LB from a second light source 705b among the plurality of light sources 705a to 705c; a first color filter CFa configured to output only red light LR in the first light LRB from the first color conversion layer CCa; and a second color filter CFb configured to output only green light LG in the second light LGB from the second color conversion layer CCb.

Meanwhile, a third light source 705c among the plurality of light sources 705a to 705c may output the blue light LB to the outside without passing through the first color conversion layer CCa, the second color conversion layer CCb, the first color filter CFa, and the second color filter CFb. Accordingly, transmittance of output light may increase, and color gamut may be improved.

Specifically, the first light source 705a among the plurality of light sources 705a to 705c is disposed in a first region, the second light source 705b among the plurality of light sources 705a to 705c is disposed in a second region spaced apart from the first region, and the third light source 705c among the plurality of light sources 705a to 705c is disposed in a third region spaced apart from the second region.

Meanwhile, the first color conversion layer CCa may be disposed over the first light source 705a, and the first color filter CFa may be disposed over the first color conversion layer CCa.

Meanwhile, the second color conversion layer CCb may be disposed over the second light source 705b, and the second color filter CFb may be disposed over the second color conversion layer CCb.

Meanwhile, a black matrix BAaa for preventing interference of adjacent light may be disposed between the first light source 705a and the second light source 705b. Accordingly, the blue light output from each of the first light source 705a and the second light source 705b is output upward.

Meanwhile, a black matrix BAab for preventing interference of adjacent light may be disposed between the second light source 705b and the third light source 705c. Accordingly, the blue light output from each of the second light source 705b and the third light source 705c is output upward.

Meanwhile, the first light LRB may include the blue light LB and the red light LR. That is, the first color conversion layer CCa may output the first light LRB including the blue light LB and the red light LR based on the input blue light.

As the first color conversion layer CCa outputs only the blue light LB and the red light LR without outputting the green light LG, the first color conversion layer CCa may be formed in a simpler manner than a color conversion layer required to output the blue light LB, the red light LR, and the green light LG.

Meanwhile, the second light LGB may include the blue light LB and the green light LG. That is, the second color conversion layer CCb may output the second light LGB, including the blue light LB and the green light LG, based on the input blue light.

As the second color conversion layer CCb outputs only the blue light LB and the green light LG without outputting the red light LG, the second color conversion layer CCb may be formed in a simpler manner than a color conversion layer required to output the blue light LB, the red light LR, and the green light LG.

Meanwhile, the display panel 210 according to an embodiment of the present disclosure may further include a multi coating layer 732 disposed over the plurality of light source 705a to 705c, an optical adhesive layer (OCA) 735 disposed over the multi coating layer 732, and a short wavelength transmitting coating layer 737 disposed over the optical adhesive layer 735.

The multi coating layer 732 is a coating layer having an anti-reflection effect, and may have, for example, a seven-layer structure including AlO3 and ZrO2 or a nine-layer structure including SiO2, ZrO2, and MgF2.

The short wavelength transmitting coating layer 737 may transmit a wavelength range of blue light, while reflecting other long-wavelength regions.

Meanwhile, the display panel 210 according to an embodiment of the present disclosure may further include a black matrix BAba disposed between the first color filter CFa and the second color filter CFb. Accordingly, transmittance of output light may increase, and color gamut may be improved.

Meanwhile, the first color filter CFa may be disposed over the first color conversion layer CCa, the second color filter CFb may be disposed over the second color conversion layer CCb, in which a sum of a height of the first color conversion layer CCa and a height of the first color filter CFa may be equal to a height of the black matrix BAba. Accordingly, ambient light may be blocked by the black matrix BAba.

Meanwhile, a sum of a height of the second color conversion layer CCb and a height of the second color filter CFb may be equal to a height of a second black matrix BAbb. Accordingly, ambient light may be blocked by the black matrix BAbb.

Meanwhile, the display panel 210 according to an embodiment of the present disclosure may further include glass GSS disposed over the first color filter CFa and the second color filter CFb. Accordingly, internal elements may be protected.

Meanwhile, the first color filter CFa and the second color filter CFb may contain a yellow-based pigment. Accordingly, only the blue light LB may be effectively blocked by the first color filter Cfa and the second color filter CFb.

The first color filter CFa and the second color filter CFb may include a yellow resist which is complementary to the blue color.

Meanwhile, the first color filter CFa and the second color filter CFb may transmit light having a wavelength of 490 nm or more.

Meanwhile, the first color filter CFa and the second color filter CFb may block light having a wavelength of 490 nm or less.

That is, the first color filter CFa and the second color filter CFb do not use a long wavelength absorbing color resist, thereby maximizing the transmittance, and effectively cutting or blocking only the blue light.

Meanwhile, the first color filter CFa and the second color filter CF have a high transmittance, thereby outputting red light and green light with high brightness.

Meanwhile, the first color filter CFa and the second color filter CFb may contain at least one of a Monoazo-based pigment, a Pyrazolone azo-based pigment, a Disazo-based pigment, an Azomethine-based pigment, an Anthraquinone-based pigment, an Isoindolinone-based pigment, a quinoline-based pigment, a Quinophthalone-based pigment, a Polycyclic-based pigment, a Dioxime-based pigment, a Benzimidazolone-based pigment, a Heterocyclic-based pigment, a Perinone-based pigment, an Inorganic pigment, and a Cyanine-based pigment. Accordingly, the first color filter CFa and the second color filter CFb may effectively block only the blue light LB.

Meanwhile, the plurality of light sources 705a to 705c may include micro light emitting diodes.

For example, the plurality of light sources 705a to 705c may include micro light emitting diodes having a size of less than 10μ and configured to output blue light.

Further, the respective micro light emitting diodes 705a to 705c may be used for output of red light, green light, and blue light.

Meanwhile, if a brightness of the first light LRB is different from a brightness of the first light LRB, a thickness hb of the second filter CFb may be different from a thickness ha of the first color filter Cfa.

For example, if a brightness of the blue light LB in the first light LRB output from the first color conversion layer CCa is greater than a brightness of the blue light LB in the second light LGB output from the second color conversion layer CCb, the thickness ha of the first color filter Cfa may be greater than the thickness hb of the second color filter CFb. Accordingly, color gamut of the output red light LR and green light LG may be improved.

In another example, if a brightness of the blue light LB in the second light LGB output from the second color conversion layer CCb is greater than a brightness of the blue light LB in the first light LRB output from the first color conversion layer CCa, the thickness hb of the second color filter CFb may be greater than the thickness ha of the first color filter CFa. Accordingly, color gamut of the output red light LR and green light LG may be improved.

In yet another example, if a brightness of the blue light LB in the second light LGB output from the second color conversion layer CCb is equal to a brightness of the blue light LB in the first light LRB output from the first color conversion layer CCa, the thickness hb of the second color filter CFb may be equal to the thickness ha of the first color filter CFa. Accordingly, color gamut of the output red light LR and green light LG may be improved.

FIGS. 8A to 14C are diagrams referred to in the description of FIG. 7.

Figure 8A:
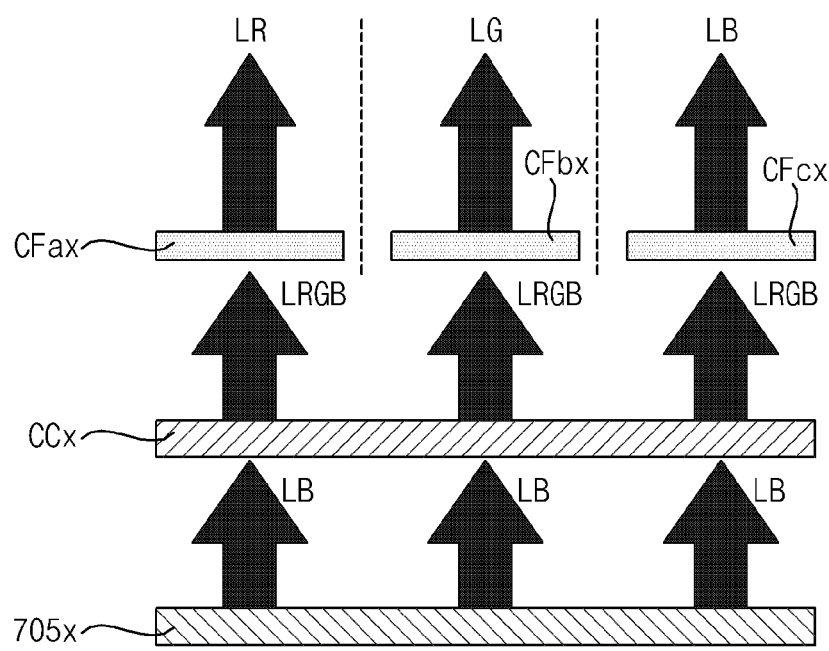
FIGS. 8A to 14C are diagrams referred to in the description of FIG. 7.

FIG. 8A is a diagram illustrating a display panel 210x associated with the present disclosure.

Referring to FIG. 8A, the display panel 210x associated with the present disclosure includes a light source 705x configured to output blue light, a color conversion layer CCx disposed over the light source 705x and configured to output light LRGB including blue light, green light, and red light, and a red color filter CFax, a green color filter CFbx, and a blue color filter CFcx which are disposed over the color conversion layer CCx, the red color filter CFax configured to output red light, the green color filter CFbx configured to output green light, and the blue color filter CFcx configured to output blue light.

Referring to FIG. 8A, the light source 705x is required to cover all areas in which the red color filter Cfax, the green color filter CFbx, and the blue color filter CFcx are disposed, such that it is required to use a line-shaped light source or a separate diffusion plate.

As the light source 705x is required to cover all areas in which the red color filter CFax, the green color filter CFbx, and the blue color filter CFcx are disposed, the light source 705x has poor directionality, making it difficult to output red light, green light, and blue light with high brightness.

Meanwhile, the color conversion layer CCx is required to output the light LRGB, i.e., white light, which includes blue light, green light, and red light, based on the input blue light, thereby resulting in lower light conversion efficiency.

In addition, the red color filter CFax is required to block green light and blue light and output only red light based on the light LRGB from the color conversion layer CCx, light transmittance decreases, making it difficult to output red light with high brightness.

Similarly, the green color filter CFbx is required to block red light and blue light and output only green light based on the light LRGB from the color conversion layer CCx, light transmittance decreases, making it difficult to output green light with high brightness.

In addition, the blue color filter CFcx is required to block green light and red light and output only blue light based on the light LRGB from the color conversion layer CCx, light transmittance decreases, making it difficult to output blue light with high brightness.

Figure 8B:
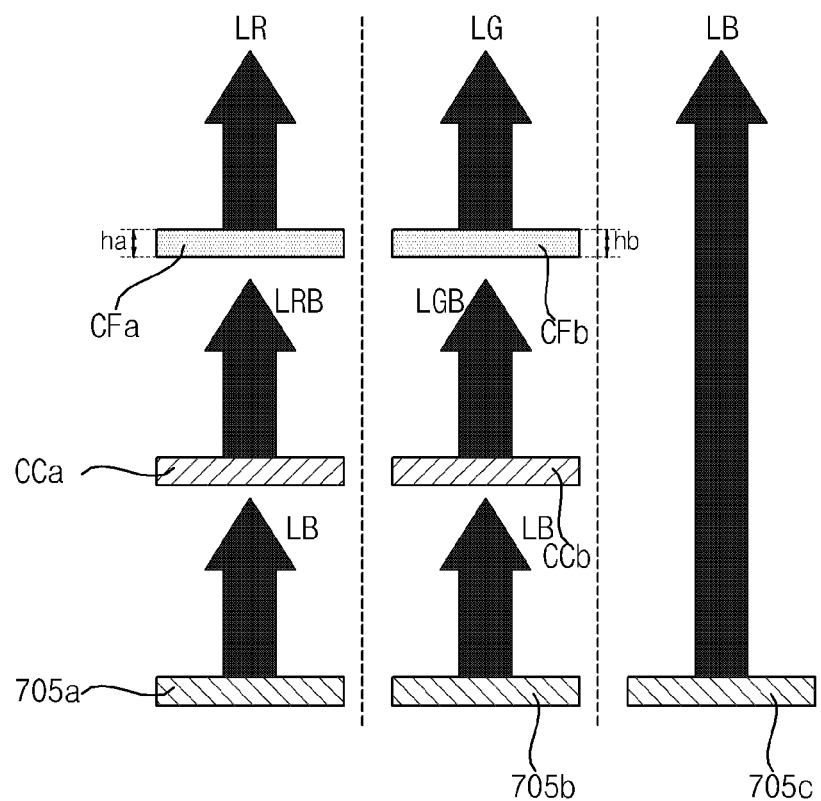

FIG. 8B is a diagram schematically illustrating the display panel 210 of FIG. 7.

Referring to FIG. 8B, the first color conversion layer CCa may be disposed over the first light source 705a, and the first color filter CFa may be disposed over the first color conversion layer CCa.

Meanwhile, the second color conversion layer CCb may be disposed over the second light source 705b, and the second color filter CFb may be disposed over the second color conversion layer CCb. Accordingly, light transmittance may increase, and color gamut may be improved.

Meanwhile, the third light source 705c may output the blue light LB to the outside without passing through the first color conversion layer CCa, the second color conversion layer CCb, the first color filter CFa, and the second color filter CFb. Accordingly, light transmittance may increase, and color gamut may be improved.

Meanwhile, the plurality of light sources 705a to 705c emit blue light at positions spaced apart from each other, such that compared to FIG. 8A, no diffusion plate is required and directionality of light in an upward direction may be further improved.

Meanwhile, the first color conversion layer CCa outputs the first light LRB including the blue light LB and the red light LR, and is not required to convert the green light LG compared to FIG. 8A, such that the first color conversion layer CCa may be simply formed.

Meanwhile, the second color conversion layer CCb outputs the second light LGB including the blue light LB and the green light LG, and is not required to convert the red light LR compared to FIG. 8A, such that the second color conversion layer CCb may be simply formed.

Then, the first color filter CFa blocks the blue light LB and transmits the red light LR based on the first light LRB.

Compared to FIG. 8A, the first color filter CFa is required to block only the blue light LB, and thus may be simply formed.

Then, the second color filter CFb blocks the blue light LB and transmits the green light LG based on the second light LGB. Compared to FIG. 8A, the second color filter CFb is required to block only the blue light LB, and thus may be simply formed.

As a result, the display panel 210 of FIG. 8B may increase transmittance of output light and improve color gamut, compared to the display panel 210x of FIG. 8A.

Figure 8C:
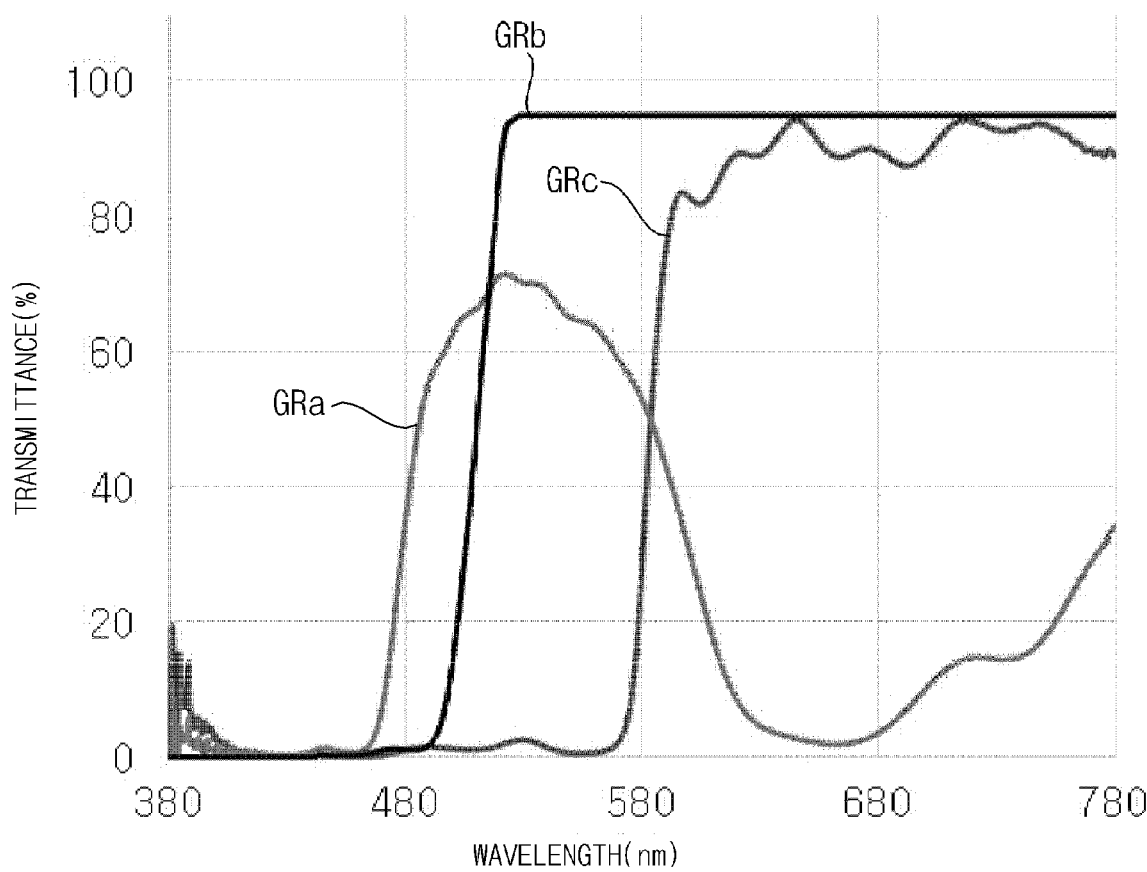

FIG. 8C is a diagram illustrating performance of the first color filter CFa and the second color filter CFb of FIG. 7.

Referring to FIG. 8C, graph GRb shows performance of the first color filter CFa and the second color filter CFb of FIG. 7, graph GRa shows performance of the green color filter CFbx of FIG. 8A, and graph GRc shows performance of the red color filter CFax of FIG. 8A.

The graph GRb shows that the first color filter CFa and the second color filter CFb of FIG. 7 transmit light having a wavelength of 90 nm or more and blocks light having a wavelength of 490 nm or less. Accordingly, only the blue light may be efficiently cut or blocked.

Meanwhile, the graph GRa shows that the green color filter CFbx of FIG. 8A is capable of transmitting green light, but blocks short-wavelength blue light as well as long-wavelength red light.

Meanwhile, the graph GRc shows that the red color filter CFax of FIG. 8A is capable of transmitting red light, but blocks green light as well as short-wavelength blue light.

As a result, only the blue light may be efficiently cut or blocked by the first color filter CFa and the second color filter CFb of FIG. 7, thereby providing high brightness light output.

Figure 9:
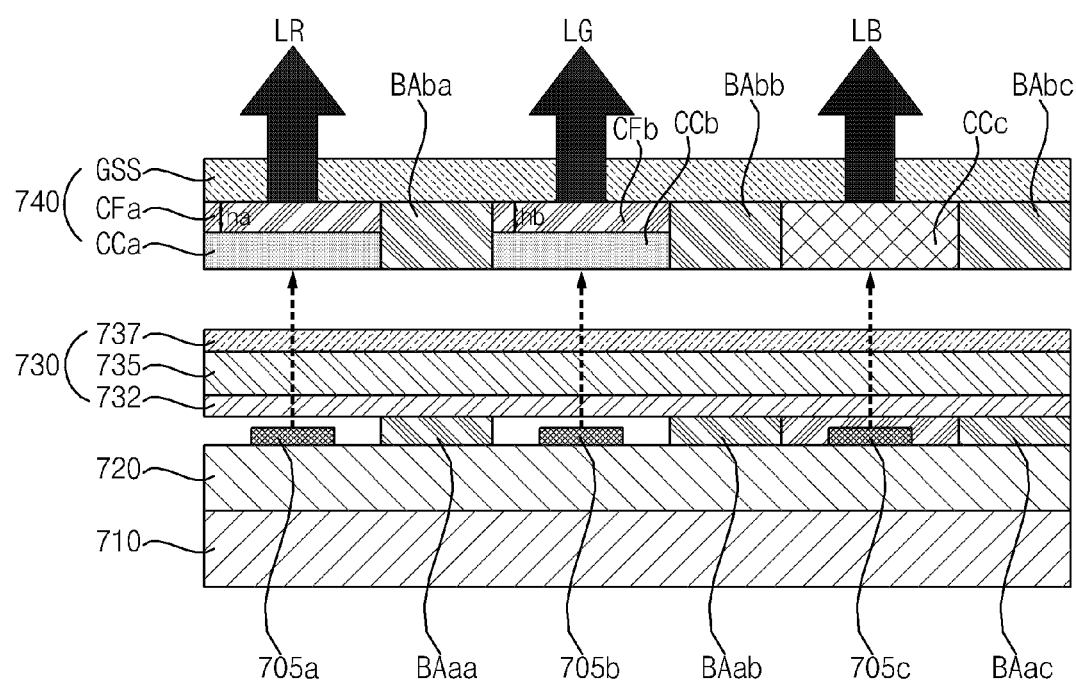

FIG. 9 is an exemplary cross-sectional view of a display panel according to another embodiment of the present disclosure.

Referring to FIG. 9, a display panel 210b according to another embodiment of the present disclosure is similar to the display panel 210 of FIG. 7, but is different in that a blue light cut filter CCc is further disposed over the third light source 705c.

That is, the display panel 210b according to another embodiment of the present disclosure includes: a plurality of light sources 705a to 705c configured to output blue light LB; a first color conversion layer CCa configured to output first light LRB based on the blue light LB from a first light source 705a among the plurality of light sources 705a to 705c; a second color conversion layer CCb configured to output second light LGB based on the blue light LB from a second light source 705b among the plurality of light sources 705a to 705c; a first color filter CFa configured to output only red light LR in the first light LRB from the first color conversion layer CCa; a second color filter CFb configured to output only green light LG in the second light LGB from the second color conversion layer CCb; and a blue light cut filter CCc disposed over a third light source 705c among the plurality of light sources 705a to 705c.

By using the blue light cut filter CCC, the blue light LB may be output with almost the same intensity as an output intensity of the red light LR and the green light LG.

As a result, color gamut of the output red light LR, green light LG, and blue light LB may be improved.

Figure 10A:
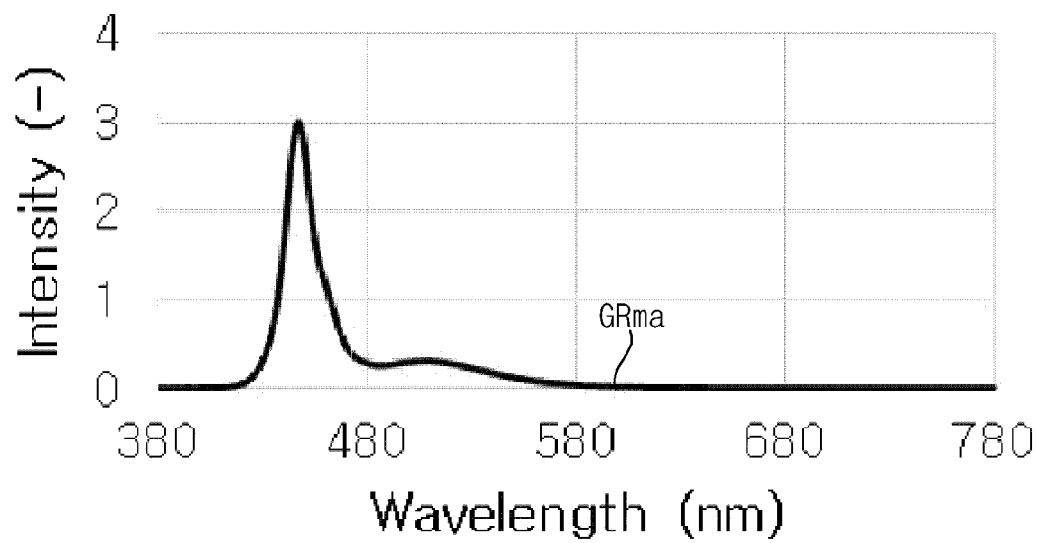

FIG. 10A is a diagram illustrating a light wavelength graph GRma of the second light LGB output from the second color conversion layer CCb which is based on inorganic nano-phosphor.

Referring to FIG. 10A, the light wavelength graph GRma of the second light LGB shows that light output from the second color conversion layer CCb includes blue light LB and green light LG.

Figure 10B:
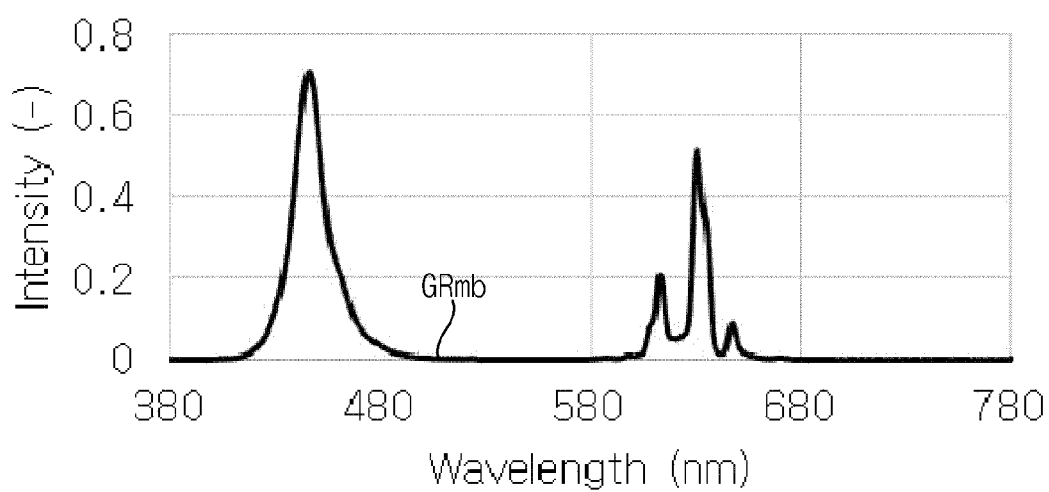

FIG. 10B is a diagram illustrating a light wavelength graph GRmb of the first light LRB output from the first color conversion layer CCa which is based on inorganic nano-phosphor.

Referring to FIG. 10B, the light wavelength graph GRmb of the first light LRB shows that light output from the first color conversion layer CCa includes blue light LB and red light LR.

Figure 11A:
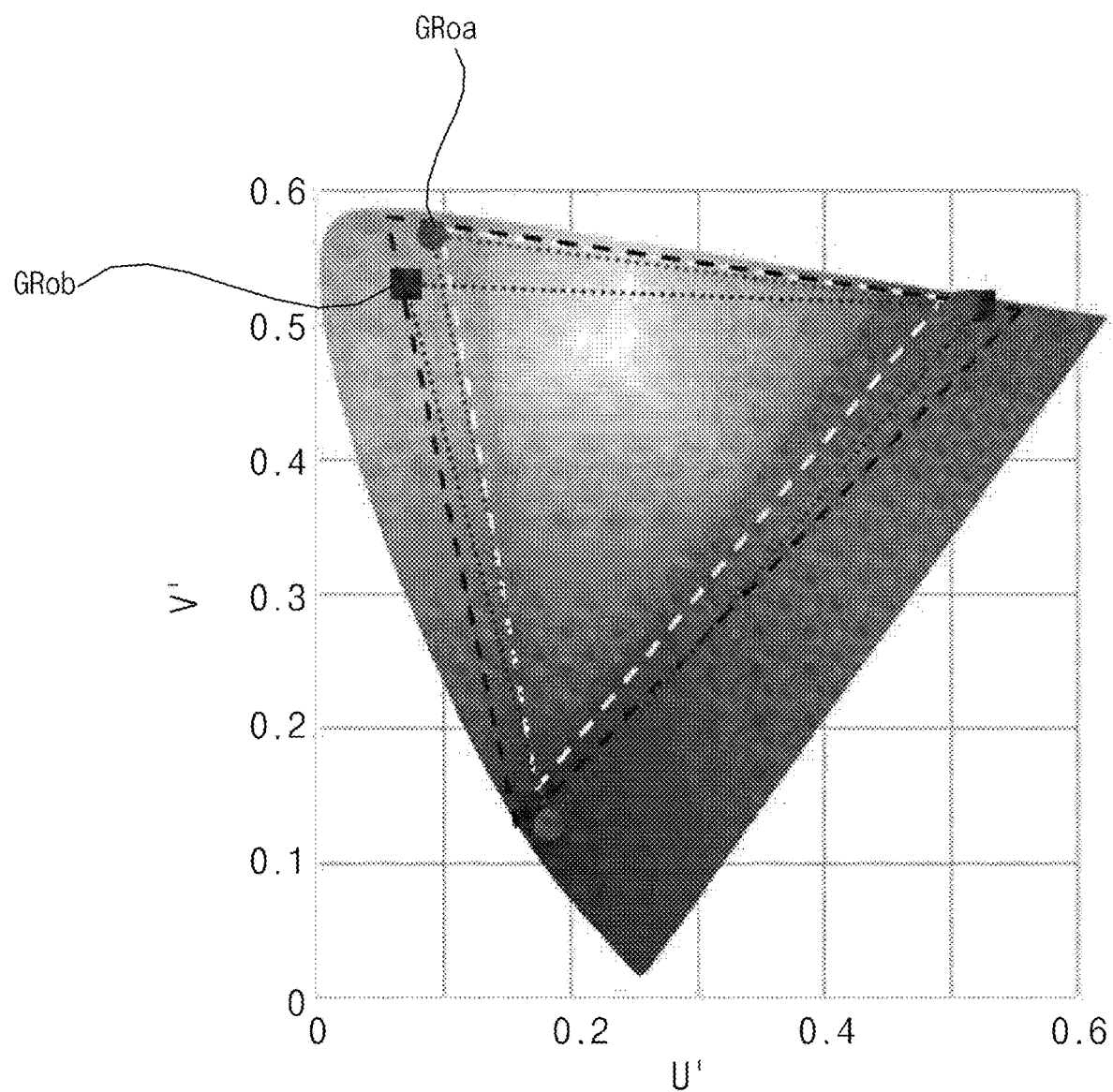

FIG. 11A is a diagram illustrating a color purity area GRoa of light output from the display panel 210 of FIG. 7, and a color purity area GRob of light output from the display panel 210x of FIG. 8A.

Referring to FIG. 11A, green light output from the display panel 210 of FIG. 7 has a color purity of 81.2%, and green light output from the display panel 210x of FIG. 8A has a color purity of 52.2%.

Accordingly, the color purity of the green light output from the display panel 210 of FIG. 7 is improved much more than the color purity of the green light output from the display panel 210x of FIG. 8A.

Figures 11B, 12A:
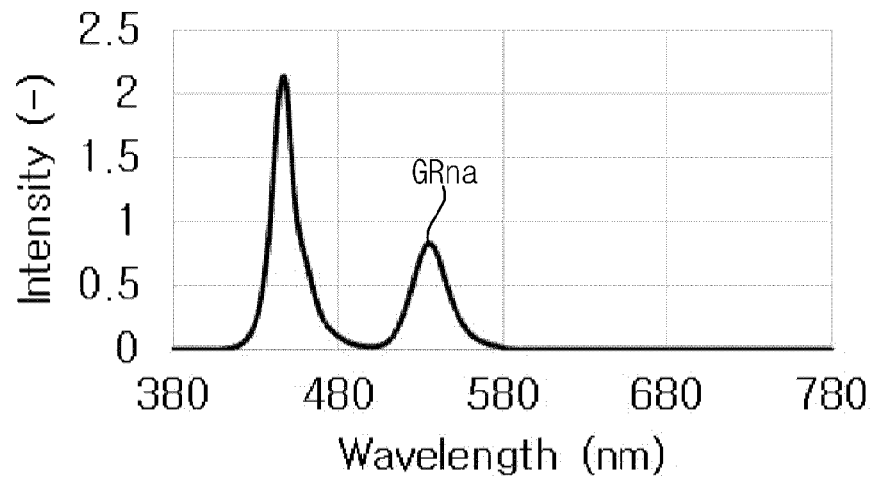

FIG. 11B is a graph of comparison between the color purity area GRoa and color purity area GRob of light illustrated in FIG. 11A.

Referring to FIG. 11B, an NTSC color gamut area ratio in the display panel 210 of FIG. 7 is 121% which is almost similar to an NTSC color gamut area ratio of 122% in the display panel 210x of FIG. 8A.

However, a color gamut (DCI-P3 overlap rate) in the display panel 210 of FIG. 7 is 98%, which is substantially different from a color gamut of 88% in the display panel 210x of FIG. 8A.

In addition, a color gamut (BT.2020 overlap rate) in the display panel 210 of FIG. 7 is 80% which is almost similar to a color gamut of 80% in the display panel 210x of FIG. 8A. As a result, in the display panel 210 of FIG. 7, the color gamut (DCI-P3 overlap rate) is greatly increased, thereby realizing better natural color reproduction.

FIG. 12A is a diagram illustrating a light wavelength graph GRna of second light LGB output from a quantum dot based second color conversion layer CCb.

Referring to FIG. 12A, based on the light wavelength graph GRna of the second light LGB, the light output from the second color conversion layer CCb includes blue light LB and green light LG.

Figures 12B, 12C:
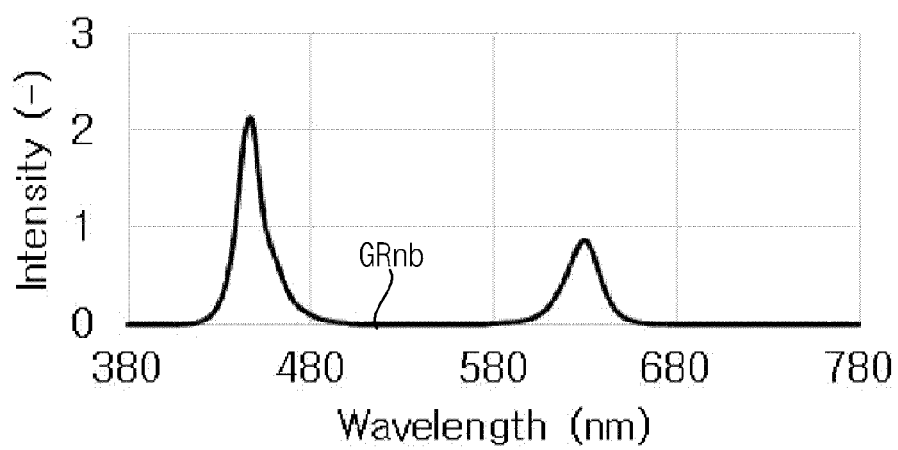

FIG. 12B is a diagram illustrating a light wavelength graph GRnb of first light LRB output from a quantum dot based first color conversion layer CCa.

Referring to FIG. 12B, based on the light wavelength graph GRnb of the first light LRB, the light output from the first color conversion layer CCa includes blue light LB and red light LR.

FIG. 12C is a diagram illustrating a table showing comparison of performance between the color filters CFbx and CFax of FIG. 8A and the color filters CFb and CFa of FIG. 7.

Referring to FIG. 12C, the color filters CFb and CFa of FIG. 7 according to an embodiment of the present disclosure have a relative luminance of 115% and 111%, respectively, and the color filters CFbx and CFax of FIG. 8A corresponding thereto have a relative luminance of 100% and 100%, respectively.

As a result, the color filters CFb and CFa of FIG. 7 according to an embodiment of the present disclosure are capable of providing high brightness light output.

Figures 13A, 13B:
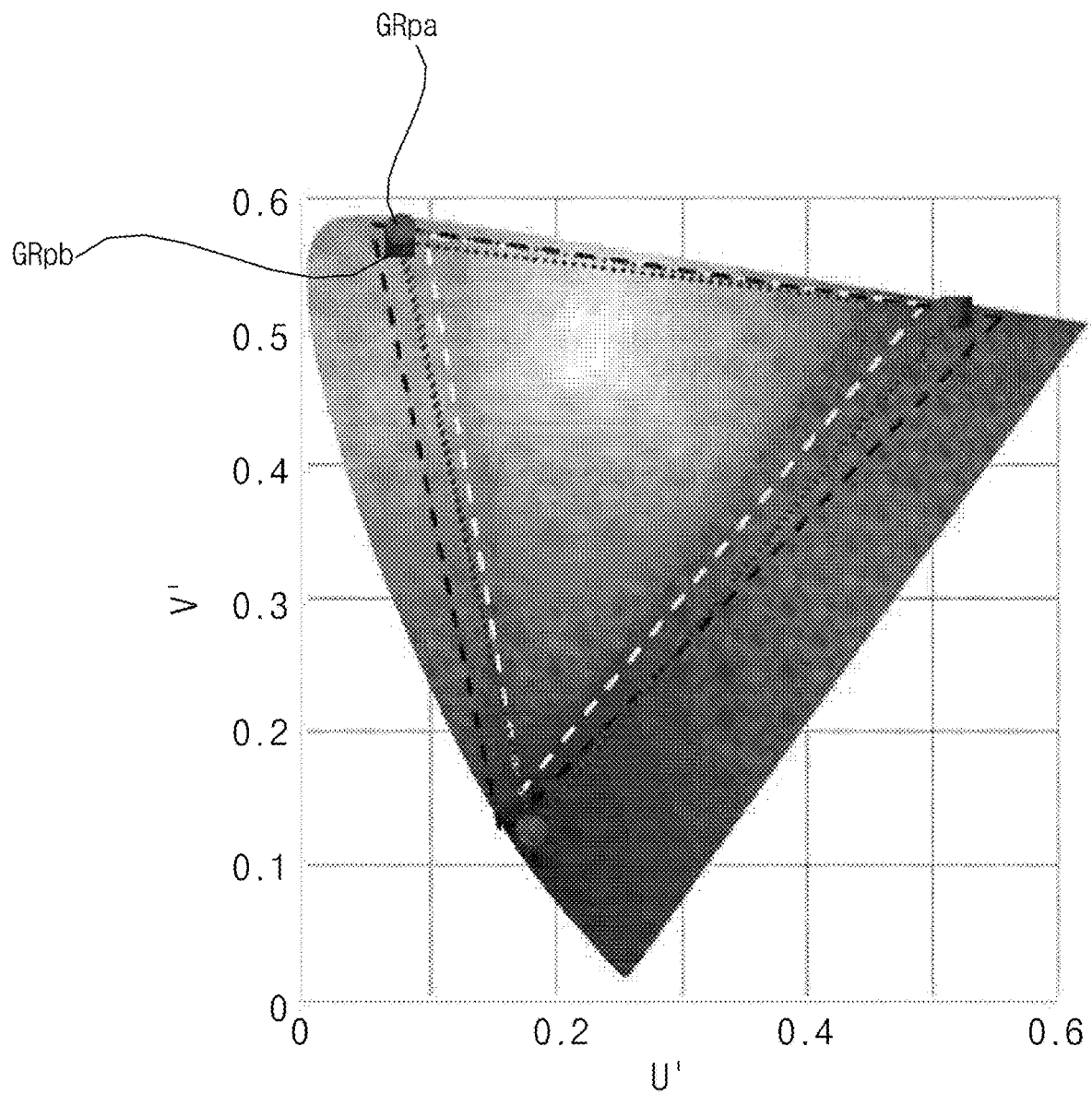

FIG. 13A is a diagram illustrating another example of a color purity area GRpa of light output from the display panel 210 of FIG. 7 and a color purity area GRpb of light output from the display panel 210x of FIG. 8A.

Referring to FIG. 13A, it is shown that green light output from the display panel 210 of FIG. 7 has a color purity of 94.8%, and green light output from the display panel 210x of FIG. 8A has a color purity of 79.5%.

Accordingly, the color purity of the green light output from the display panel 210 of FIG. 7 is improved much more than the color purity of the green light output from the display panel 210x of FIG. 8A.

FIG. 13B is a diagram illustrating a table of comparison between the color purity area GRpa and the color purity area GRpb of FIG. 13A.

Referring to FIG. 13B, an NTSC color gamut area ratio in the display panel 210 of FIG. 7 is 171% which is almost similar to an NTSC color gamut area ratio of 128% in the display panel 210x of FIG. 8A.

However, a color gamut (DCI-P3 overlap rate) in the display panel 210 of FIG. 7 is 99%, which is improved compared to a color gamut of 99% in the display panel 210x of FIG. 8A.

In addition, a color gamut (BT.2020 overlap rate) in the display panel 210 of FIG. 7 is 74% which is almost similar to a color gamut of 74% in the display panel 210x of FIG. 8A.

As a result, in the display panel 210 of FIG. 7, the color gamut (DCI-P3 overlap rate) is increased, thereby realizing better natural color reproduction.

Figure 14A:
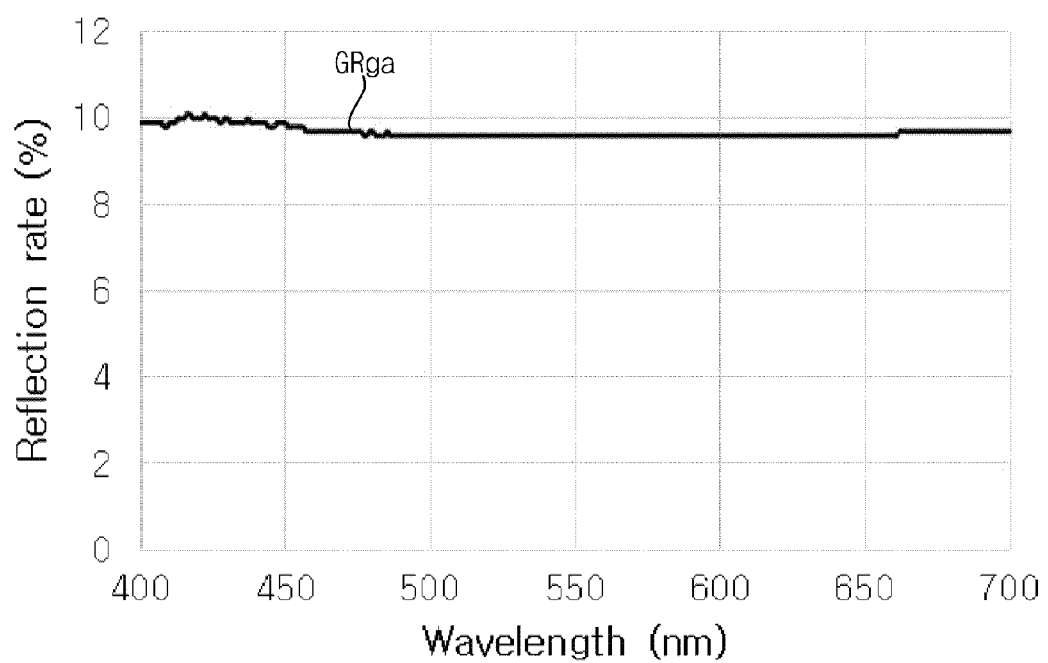
Figure 14B:
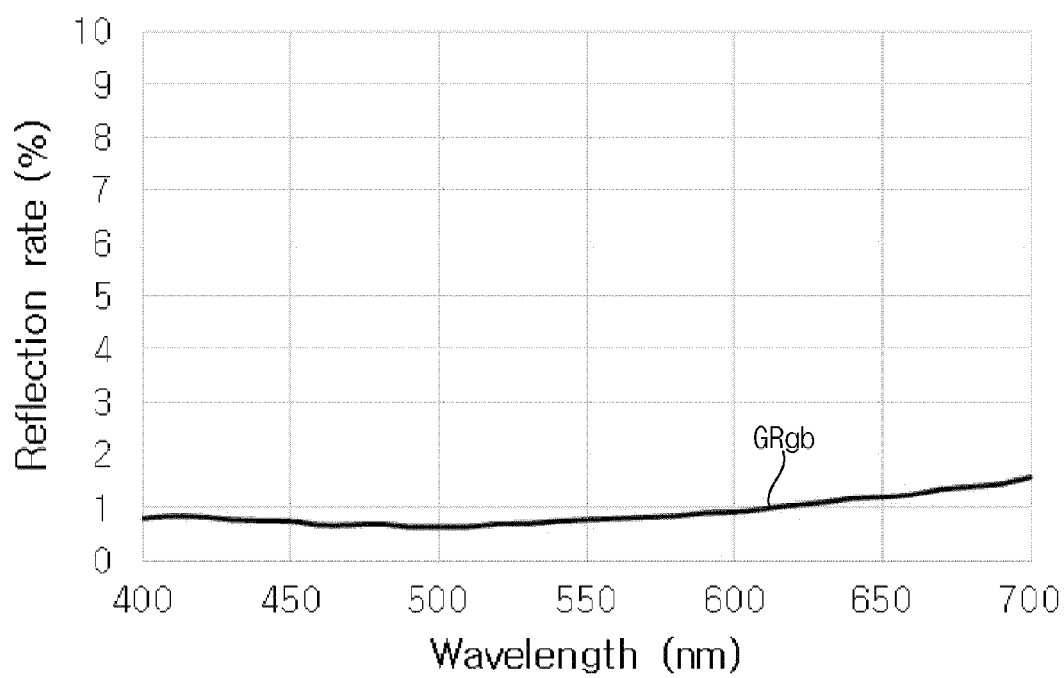

FIG. 14A is a diagram illustrating graph GRga showing reflectivity in the case where the multi coating layer 732 of FIG. 7 is not present, and FIG. 14B is a diagram illustrating graph GRgb showing reflectivity in the case where the multi coating layer 732 of FIG. 7 is present.

Referring to FIGS. 14A and 14B, the reflectivity in the case where the multi coating layer 732 of FIG. 7 is not present is approximately 10%, but the reflectivity in the case where the multi coating layer 732 of FIG. 7 is present is approximately 1% to 2%. Accordingly, an anti-reflection effect is achieved using the multi coating layer 732.

In addition, all of the blue light output from the plurality of light sources 705a to 705c is superficially absorbed and transmitted, thereby increasing efficiency and achieving high brightness.

Figure 14C:
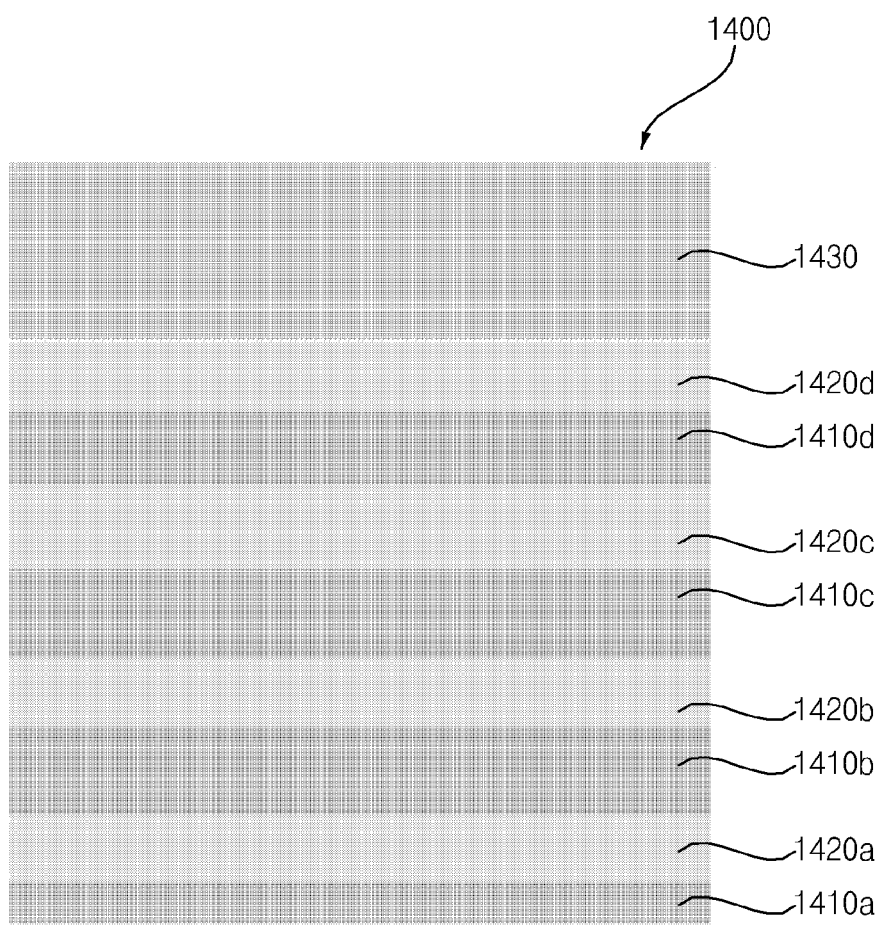

FIG. 14C is a diagram illustrating a nine-layer structure of the multi coating layer 732.

Referring to FIG. 14C, the multi coating layer 732 may have a nine-layer structure including SiO2, ZrO2, MgF2.

In the drawing, an example is illustrated in which a first SiO2 layer 1410a, a first ZrO2 layer 1420a, a second SiO2 layer 1410b, a second ZrO2 layer 1420b, a third SiO2 layer 1410c, a third ZrO2 layer 1420c, and a fourth SiO2 layer 1410d, a fourth ZrO2 layer 1420d are sequentially stacked over each other, and an MgF2 layer 1430 is stacked on the fourth ZrO2 layer 1420d.

Meanwhile, the thickness of the MgF2 layer is preferably greater than the thickness of the respective SiO2 layers or the thickness of the respective ZrO2 layers.

Accordingly, an anti-reflection effect is achieved using the multi coating layer 732.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made herein without departing from the subject matter and scope of the present disclosure.

What is claimed is:

1. A display panel comprising:
a plurality of light sources configured to output blue light;
a first color conversion layer configured to output first light based on the blue light from a first light source among the plurality of light sources;
a second color conversion layer configured to output second light based on the blue light from a second light source among the plurality of light sources;
a first color filter configured to output only red light in the first light from the first color conversion layer;
a second color filter configured to output only green light in the second light from the second color conversion layer; and
a multi coating layer disposed over the plurality of light sources,
wherein the multi coating layer includes a $MgF_2$ layer, and a thickness of the $MgF_2$ layer is greater than a thickness of other layers in the multi coating layer.

2. The display panel of claim 1, wherein a third light source among the plurality of light sources is configured to output the blue light to an outside without passing through the first color conversion layer, the second color conversion layer, the first color filter, and the second color filter.

3. The display panel of claim 1, wherein the first light comprises the blue light and the red light, and the second light comprises the blue light and the green light.

4. The display panel of claim 1, further comprising:
an optical adhesive layer (OCA) disposed over the multi coating layer; and
a short wavelength transmitting coating layer disposed over the optical adhesive layer.

5. The display panel of claim 1, further comprising a black matrix disposed between the first color filter and the second color filter.

6. The display panel of claim 5, wherein the first color filter is disposed over the first color conversion layer, and the second color filter is disposed over the second color conversion layer,
wherein a sum of a height of the first color conversion layer and a height of the first color filter is equal to a height of the black matrix.

7. The display panel of claim 1, further comprising glass disposed over the first color filter and the second color filter.

8. The display panel of claim 1, wherein in response to a brightness of the first light being different from a brightness of the second light, a thickness of the second color filter is different from a thickness of the first color filter.

9. The display panel of claim 3, wherein in response to a brightness of the blue light in the first light output from the first color conversion layer being greater than a brightness of the blue light in the second light output from the second color conversion layer, a thickness of the first color filter is greater than a thickness of the second color filter.

10. The display panel of claim 3, wherein in response to a brightness of the blue light in the second light output from the second color conversion layer being greater than a brightness of the blue light in the first light output from the first color conversion layer, a thickness of the second color filter is greater than a thickness of the first color filter.

11. The display panel of claim 3, wherein in response to a brightness of the blue light in the second light output from the second color conversion layer being equal to a brightness of the blue light in the first light output from the first color conversion layer, a thickness of the second color filter is equal to a thickness of the first color filter.

12. The display panel of claim 2, further comprising a blue light cut filter disposed over the third light source among the plurality of light sources.

13. The display panel of claim 1, wherein the first color filter and the second color filter comprise a yellow-based pigment.

14. The display panel of claim 1, wherein the first color filter and the second color filter contain at least one of a Monoazo-based pigment, a Pyrazolone azo-based pigment, a Disazo-based pigment, an Azomethine-based pigment, an Anthraquinone-based pigment, an Isoindolinone-based pigment, a quinoline-based pigment, a Quinophthalone-based pigment, a Polycyclic-based pigment, a Dioxime-based pigment, a Benzimidazolone-based pigment, a Heterocyclic-based pigment, a Perinone-based pigment, an Inorganic pigment, and a Cyanine-based pigment.

15. The display panel of claim 1, wherein the plurality of light sources comprise micro light emitting diodes.

16. An image display apparatus comprising:
a signal processing device configured to output a processed video signal; and
a display configured to display an image based on the video signal,
wherein the display comprises a display panel,
wherein the display panel comprises:
a plurality of light sources configured to output blue light;
a first color conversion layer configured to output first light based on the blue light from a first light source among the plurality of light sources;
a second color conversion layer configured to output second light based on the blue light from a second light source among the plurality of light sources;
a first color filter configured to output only red light in the first light from the first color conversion layer;
a second color filter configured to output only green light in the second light from the second color conversion layer; and
a multi coating layer disposed over the plurality of light sources,
wherein the multi coating layer includes a $MgF_2$ layer, and a thickness of the $MgF_2$ layer is greater than a thickness of other layers in the multi coating layer.

17. The image display apparatus of claim 16, wherein a third light source among the plurality of light sources is configured to output the blue light to an outside without passing through the first color conversion layer, the second color conversion layer, the first color filter, and the second color filter.

18. The image display apparatus of claim 16, wherein the display panel further comprises:
an optical adhesive layer (OCA) disposed over the multi coating layer; and
a short wavelength transmitting coating layer disposed over the optical adhesive layer.

19. The image display apparatus of claim 16, wherein the display panel further comprises a black matrix disposed between the first color filter and the second color filter.

20. The image display apparatus of claim 16, wherein the display panel further comprises glass disposed over the first color filter and the second color filter.

* * * * *